July 21, 1959  C. T. HILL  2,895,796
PRODUCTION OF IRON CHLORIDE AND SULFUR
Filed March 19, 1954
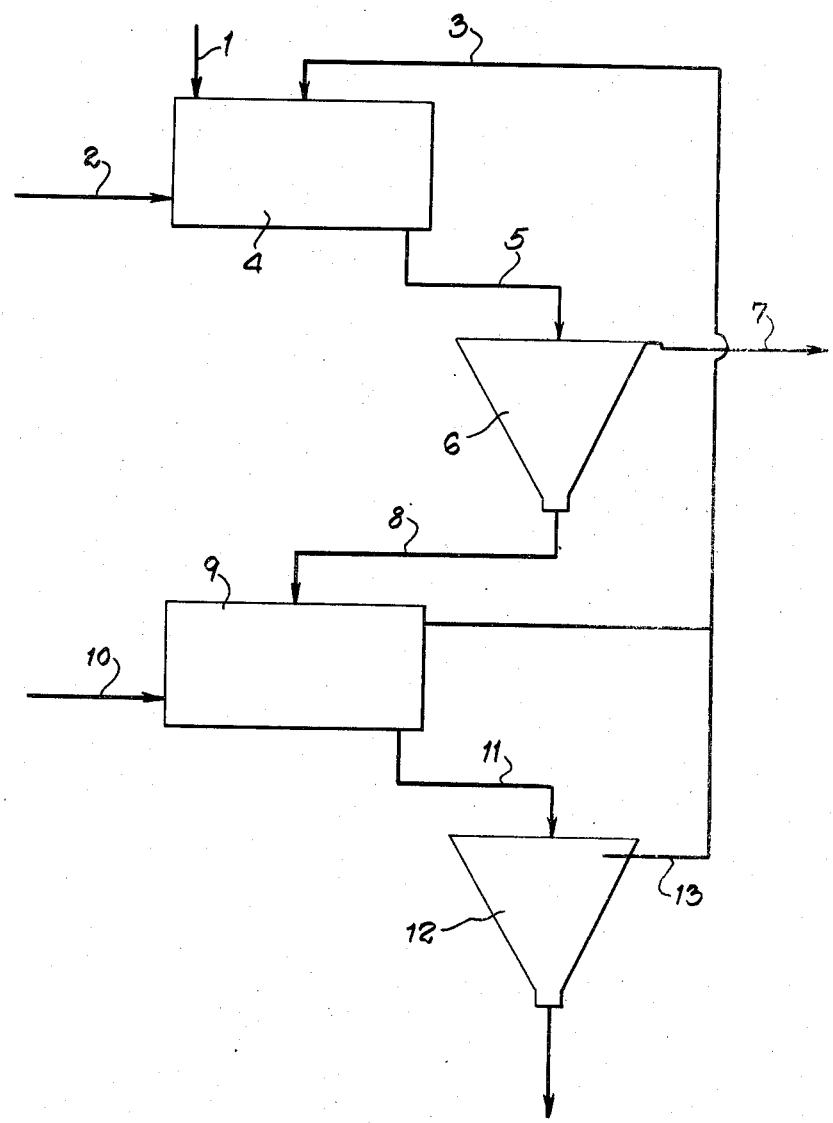
INVENTOR.
CYRIL T. HILL
BY
*Kenyon & Kenyon*
ATTORNEYS

2,895,796

PRODUCTION OF IRON CHLORIDE AND SULFUR

Cyril Thomas Hill, New York, N.Y., assignor to Texas Gulf Sulphur Company, New York, N.Y., a corporation of Texas Application March 19, 1954, Serial No. 417,413

9 Claims. (Cl. 23—87)

This invention relates to the decomposition of sulfide-containing minerals, and particularly to the interaction of sulfide-containing minerals with a chlorinating agent such as free chlorine or available chlorine in chlorine compounds, so as to produce sulfur and metal chlorides, the latter being thereafter treated and recovered as desired by methods known in the art. One of the objects of my invention is to provide an improved process for extracting sulfur from sulfide-containing minerals. A further object of my invention is to decompose such minerals by means of their reaction with chlorine, either elemental or in easily decomposable chlorine compounds, in such a way as to render available for recovery the sulfur and the corresponding metal chlorides in a manner which obviates the disadvantages inherent in prior art processes. Other objects of my invention will be apparent from the specification and claims which follow.

The reactions between metal sulfides and chlorine have long been known, and in fact proposals have been made to utilize these reactions as a means of decomposing the sulfide minerals to produce sulfur and metal chlorides. Since in such processes an essential step is the removal of sulfur formed in the reaction, the prior art processes have involved operations at temperatures above the distillation range of sulfur or under such lower temperature conditions as would nevertheless permit of volatilization of the sulfur substantially as quickly as it is formed. Such processes, however, have not been successful in practice. The reasons for their failure have been manifold, but two important reasons were the difficulties in providing apparatus capable of withstanding the effects of chlorine and of its by-products under the conditions and also the fact that the ferrous chloride formed interfered with the complete reaction of the ore with the chlorine. Endeavors to overcome these difficulties resulted in expensive construction having to be employed in the necessary furnaces and other apparatus, while to overcome the second main difficulty the rotary furnaces were, in some cases, provided with balls of refractory material in order to break the chloride crust from the surface of the mineral sulfide. However, neither of these expedients, nor others adopted later have been successful in making possible a satisfactory working process.

I have found that by operating at a relatively low temperature, i.e. above the melting point but below the boiling point of sulfur under the prevailing conditions, I can achieve rapid and economical reaction of the mineral sulfides together with adequate removal of products and by-products from the surface of the sulfide particles, provided that I carry out the operation in the presence of a relatively large volume of liquid, as more fully described below.

Among the sulfide-containing minerals which lend themselves to treatment by the novel process of my invention are the sulfides of iron, such as pyrites and pyrrhotite. However, I can also treat non-ferrous metal sulfides by my process, as well as iron sulfides containing non-ferrous metal sulfides and mixtures of iron and non-ferrous metal sulfides.

As a source of chlorine, I may use any chlorinating agent, such as free chlorine, sulfur chlorides, ferric chloride and the like.

My process may be carried out at temperatures in the range 100–440° C., and I prefer to operate between 150° C. and 350° C.

I can operate either at atmospheric or superatmospheric pressures, and, at temperatures above about 300° C., I prefer superatmospheric pressure. Although subatmospheric pressure operation is not precluded, I do not find that it has any advantages.

The general process of the decomposition of iron sulfides with chlorine depends mainly upon the following reactions:

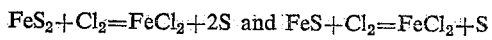

from which it will be observed that ferrous chloride and sulfur are formed. These will naturally both be produced on the surface of the sulfide which comes in contact with the chlorine. At temperatures in my range the sulfur will be present as a liquid and the ferrous chloride as a solid. The density of ferrous chloride is considerably lower than that of the metal sulfides and it will tend to envelop the sulfide particles and to shield them from further decomposition. At the same time the sulfur produced in the reaction further tends to shield the particles.

I have found that when the reaction is carried out in the presence of liquids having the properties described below the stated disadvantages are overcome. I find that numerous inorganic and organic liquids are suitable for my purpose provided that they dissolve the chlorinating agent used, or chlorine liberated therefrom, preferably without reaction. However, a liquid medium that reacts with the chlorinating agent is satisfactory provided that excessive amounts of acids or other unwanted by-products are not formed and that the reaction is either readily reversible or yields a product which itself will chlorinate the metal sulfide.

Examples of organic compounds which are liquid under my reaction conditions and in which chlorine, for example, is soluble without reaction include known chlorinated or fluorinated hydrocarbons, which may be straight chain hydrocarbons, aromatics, diphenyls, naphthalenes and so on provided only that they are sufficiently halogenated so that they will not react further with chlorine under my reaction conditions. Among such compounds are octochloronaphthalene, decachlorodiphenyl, perfluoranthane, perfluorohexylamine, perfluoro lubricating oil, perfluoro kerosene, and the perfluoro fused ring compounds, such as perfluoroacenaphthane.

Examples of inorganic compounds which are reactive with chlorine and which may be used in my process are sulfur and the various sulfur chlorides.

Since the primary function of the added liquid in my process is to remove from the surface of the metal sulfides the sulfur and metal chlorides formed in the reaction, it is necessary that the liquid be present in large amounts relative to the sulfides. I have found that from about 2 to 10 times as much liquid by weight as metal sulfide is desirable. It is also essential that good agitation be provided so that the washing action of the liquid will be fully utilized.

When sulfur is used as such a liquid, some of the chlorine may react with the sulfur to form sulfur chlorides. However, this does not interfere with the overall operation of my process because sulfur chlorides in turn react with iron sulfides according to the reactions:

$$FeS_2 + S_2Cl_2 = FeCl_2 + 4S$$
$$FeS + S_2Cl_2 = FeCl_2 + 3S$$

Moreover, as is well known, the reactions between sulfur and chlorine to form sulfur chlorides is reversible and at the higher temperatures within my range the equilibrium is in the direction of the elements instead of the compound. However, the precise manner in which the reactions occur is not critical.

The annexed drawing shows, in flow-diagram form, one embidiment of my invention, in which surfur is used as the liquid and elemental chlorine as the primary chlorinating agent.

In carrying out my invention by the process illustrated in the drawing, finely ground sulfide mineral, such as iron sulfide, suitably dried by means known in the art, is introduced into a bulk or stream of molten sulfur. As shown in the diagram, the sulfide may be introduced through line 1, the chlorine through line 2, and the sulfur through line 3 into a reaction vessel 4 which is provided with mixers, propellers, circulating pumps, or other efficient agitating means. As set forth above, from 2 to 10 parts by weight of sulfur are preferably present for each part of sulfide. In stage 1 the chlorine is preferably present in less than stoichiometric proportions, the reaction being completed in stage 2. Products leaving reactor 4 through line 5 include a suspension of metal chloride, together with unreacted sulfide, in sulfur. These products pass into a settler or thickener 6 in which a major part of the liquid sulfur is separated from the solid metal chloride. Depending on the ratio of chlorine and sulfides used in stage 1, the sulfur may contain more or less sulfur chloride formed by the reaction between sulfur and chlorine. However, I prefer to operate with an excess of sulfides in stage 1, so that any sulfur chloride present will be completely reacted. The amount of sulfur drawn off settler 6 through line 7 will be approximately the amount produced by the reaction, the bulk of the sulfur in the system being recycled. The bottoms from settler 6, which include metal chlorides, unreacted sulfide and sulfur, are passed through line 8 into a second stage reaction vessel 9. In reactor 9 the sulfides remaining unreacted in stage 1 are further chlorinated in the presence of an excess of the liquid sulfur so as to completely decompose the sulfide. Under these conditions, where sulfur is the liquid, it may not be possible to prevent the formation of some sulfur chloride, which will remain in solution in the sulfur. However, after passing through line 11 into settler 12 the sulfur containing sulfur chloride impurities is recycled, in part to reactor 9 and in part to reactor 4 where it comes in contact with fresh sulfides under such conditions as regards temperature, ratio of reactants and the like as to be freed from sulfur chloride.

Ferrous chloride is removed as solid along with non-ferrous metal chlorides formed from non-ferrous metal sulfides admixed with or present in the iron sulfide from settler 12. The ferrous chloride may be converted to ferric chloride by methods known in the art or may be heated with air or oxygen to convert it into ferric oxide with liberation of chlorine which is then recycled to the reactor of stage 2 through line 10 together with ferric chloride if produced and with such make-up chlorine as is necessary.

When liquids other than sulfur are used, the flow will, of course, be modified as necessary to separate the sulfur formed. The nature of the modifications will depend upon the characteristics of the liquid.

Following are examples of my process as carried out on a laboratory scale using sulfur as the liquid;

*Example I*

A mixture of 10 g. of pyrite and 100 g. of sulfur was treated with chlorine at a temperature of 150° C. at atmospheric pressure for 75 minutes. A conversion of 77.6 percent of the iron content to water soluble iron compounds was effected.

The following is an example using superatmospheric pressure with sulfur as the liquid and sulfur dichloride as the chlorinating agent:

*Example II*

One part of $FeS_2$, ten parts of sulfur and one part of sulfur dichloride were heated in a sealed tube at 360° C. for one hour. 95% of the iron content of the pyrites was converted to ferrous chloride.

My invention also includes the use of sulfur monochloride as the liquid:

*Example III*

Chlorine was passed through a mixture of pyrite and sulfur monochloride at 120° C. at atmospheric pressure for 30 minutes. The conversion was 93.9 percent.

The above examples are not by way of limitation, and the scope of my invention is limited only by the specification and claims.

What is claimed is:

1. A process of obtaining sulfur and iron chloride comprising treating iron sulfide with chlorine at a temperature between 100 and 440° C. in the presence of a liquid solvent of chlorine.

2. A process of obtaining sulfur and iron chloride comprising treating iron sulfide with chlorine at a temperature between 100 and 440° C. in the presence of liquid sulfur.

3. A process of decomposing iron sulfide comprising suspending finely ground iron sulfide in from about 2 to about 10 times its weight of a liquid solvent of chlorine, maintaining said liquid at a temperature between the melting and boiling points of sulfur, passing into the suspension a chlorinating agent thereby converting the iron sulfide into sulfur in liquid phase and iron chloride, and separating sulfur from the reaction mixture.

4. A process of decomposing iron sulfide comprising suspending finely ground iron sulfide in from about 2 to about 10 times its weight of sulfur, maintaining said sulfur in the liquid phase at a temperature between 100 and 440° C., passing into the suspension a chlorinating agent thereby converting the iron sulfide into sulfur and iron chloride, and separating sulfur in liquid phase from the reaction mixture.

5. In a continuous process of decomposing iron sulfide the steps of commingling said sulfide in finely divided form with a liquid solvent of chlorine, agitating the resulting mixture, continuously adding a chlorinating agent to said mixture in a reaction zone, maintaining in said zone throughout the reaction an amount of liquid ranging from about 2 to about 10 times the weight of iron sulfide in said zone at a temperature between 100 and 440° C., continuously withdrawing a suspension comprising reaction products from said zone, and separating solids comprising iron chloride from said suspension.

6. In a continuous process of decomposing iron sulfide the steps of commingling said sulfide in finely divided form with sulfur, agitating the resulting mixture, continuously adding a chlorinating agent to said mixture in a reaction zone while maintaining the mixture at a temperature between 100 and 440° C., continuously withdrawing a suspension comprising reaction products and liquid sulfur from said zone, and separating solids comprising iron chloride from said suspension.

7. In a continuous process of decomposing iron sulfide the steps of commingling said sulfide in finely divided form with sulfur, agitating the resulting mixture, continuously adding chlorine to said mixture in a reaction zone at a temperature between 100 and 440° C., continuously withdrawing a suspension comprising reaction products from said zone, and separating solids comprising iron chloride from said suspension.

8. In a continuous process of decomposing iron sulfide the steps of commingling said sulfide in finely divided form with sulfur, agitating the resulting mixture, continuously adding ferric chloride to said mixture in a reaction zone at a temperature between 100 and 440° C., continuously withdrawing a suspension comprising reaction products from said zone, and separating solids comprising iron chloride from said suspension.

9. In a continuous process of decomposing iron sulfide the steps of commingling said sulfide in finely divided form with sulfur, agitating the resulting mixture, continuously adding a chloride of sulfur to said mixture in a reaction zone at a temperature between 100 and 440° C., continuously withdrawing a suspension comprising reaction products from said zone, and separating solids comprising iron chloride from said suspension.

References Cited in the file of this patent

UNITED STATES PATENTS

| 1,898,702 | Wescott | Feb. 21, 1933 |
| 1,904,484 | Levy | Apr. 18, 1933 |
| 1,928,406 | Bacon | Sept. 26, 1933 |

OTHER REFERENCES

"Metals Transaction," vol. 185, November 1949, pp. 785–788.